United States Patent

Shiraishi et al.

(10) Patent No.: US 6,787,631 B2
(45) Date of Patent: Sep. 7, 2004

(54) POLYARYLENE SULFIDE RESIN

(75) Inventors: Kazuto Shiraishi, Tokyo (JP); Toshihiro Yamamoto, Fukuoka (JP)

(73) Assignee: Nippon Steel Chemical Co., Ltd., Tokyo (JP)

(*) Notice: Subject to any disclaimer, the term of this patent is extended or adjusted under 35 U.S.C. 154(b) by 0 days.

(21) Appl. No.: 10/399,753

(22) PCT Filed: Dec. 11, 2001

(86) PCT No.: PCT/JP01/09877

§ 371 (c)(1), (2), (4) Date: Apr. 22, 2003

(87) PCT Pub. No.: WO02/38651

PCT Pub. Date: May 16, 2002

(65) Prior Publication Data

US 2004/0006197 A1 Jan. 8, 2004

(30) Foreign Application Priority Data

Nov. 13, 2000 (JP) .......... 2000-345567

(51) Int. Cl.$^7$ .......... C08G 69/08
(52) U.S. Cl. .......... 528/310; 528/321; 528/322; 528/373; 528/374; 528/397; 528/488
(58) Field of Search .......... 528/310, 321, 528/322, 373, 374, 397, 488

(56) References Cited

FOREIGN PATENT DOCUMENTS

| JP | 04-372624 A1 | 12/1992 |
| JP | 05-170908 A1 | 7/1993 |
| JP | 05-186594 A1 | 7/1993 |
| JP | 08-245806 A1 | 9/1996 |

OTHER PUBLICATIONS

Ostlinning et al., Preparation of polythioarylenes with low crystallization temperatures, Ger. Offen., Chem Abstract 109: 171125.*
International Search Report mailed on Feb. 12, 2002.
International Preliminary Examination Report mailed on Feb. 4, 2003.

* cited by examiner

Primary Examiner—Duc Truong
(74) Attorney, Agent, or Firm—Rader, Fishman & Grauer PLLC

(57) ABSTRACT

This invention relates to a novel polyarylene sulfide resin or a resin composition comprising said polyarylene sulfide resin moldable with reduced generation of flash. The polyarylene sulfide resin of this invention comprises 0.5–10% by weight of the constituent unit represented by the following general formula (1) and 80–99.5% by weight of the constituent unit represented by the following general formula (2):

$$-(Ar_1-S-)_n \quad (1)$$

$$-(Ar_2-S-)_m \quad (2)$$

wherein $Ar_1$ is the radical represented by general formula (3),

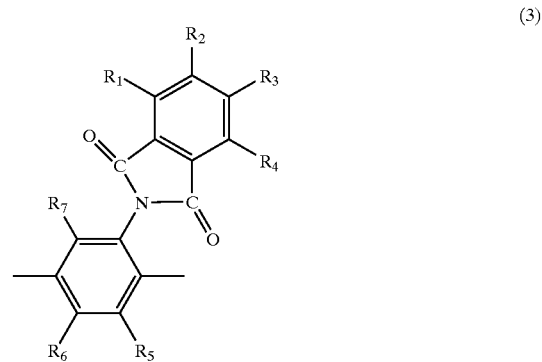

(3)

$Ar_2$ is phenylene or alkyl-substituted phenylene radical, $R_1$–$R_7$ are independently hydrogen atoms or lower alkyl radicals containing 1–3 carbon atoms and n and m are integers of 1 or more.

4 Claims, No Drawings

POLYARYLENE SULFIDE RESIN

TECHNICAL FIELD OF THE INVENTION

This invention relates to novel polyarylene sulfide resins and, more particularly, to polyarylene sulfide resins which are moldable with reduced generation of flash.

BACKGROUND TECHNOLOGY

Polyphenylene sulfide resins (hereinafter referred to as PPS resins) are high-melting heat-resistant crystalline resins with excellent properties in respect to flow, resistance to organic solvents, electrical properties and flame retardance. On account of these features, PPS resins are widely used in recent years as materials in the manufacture of parts of electrical and electronic instruments, automobiles and chemical instruments. However, the problem facing PPS resins is their tendency to generate flash in injection molding of articles, for example, connectors and the like. The following methods are disclosed to solve this problem; to blend linear PPS resins with crosslinked PPS resins which melt turning gel-like, to blend PPS resins with polyphenylene ether resins (JP 1997-157525 A), to blend low-viscosity PPS resins with high-viscosity PPS resins (JP 1995-278432 A) and to blend PPS resins with polybutylene naphthalate resins (JP 1998-292099 A). However, any of these methods partly damages the excellent characteristics of PPS resins as the result of blending. Improvement of moldability by copolymerization of PPS resins with polymers containing specified epoxy radicals is disclosed in JP 1990-182726 A, but partial damage of PPS resins also occurred here.

An object of this invention is to provide novel polyarylene sulfide resins moldable with reduced generation of flash when molded by themselves or as part of resin compositions.

DISCLOSURE OF THE INVENTION

This invention relates to a polyarylene sulfide resin comprising 0.5–10% by weight of the constituent unit represented by the following general formula (1) and 80–99.5% by weight of the constituent unit represented by the following general formula (2):

(1)

(2)

wherein $Ar_1$ is the radical represented by general formula (3), $Ar_2$ is phenylene or alkyl-substituted phenylene radical, $R_1$–$R_7$ are independently hydrogen atoms or lower alkyl groups containing 1–3 carbon atoms and n and m are integers of 1 or more.

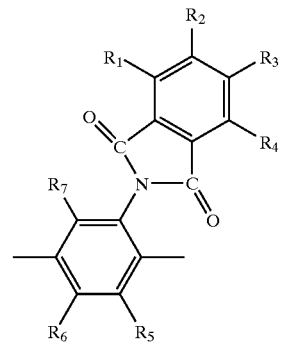
(3)

Further, this invention relates to a polyarylene sulfide resin composition comprising the aforementioned polyarylene sulfide resin.

Still further, this invention relates to a process for preparing a polyarylene sulfide resin by polymerizing polychloro aromatic compounds comprising 0.5–10% by weight of a dichloroarylene represented by the following general formula (4)

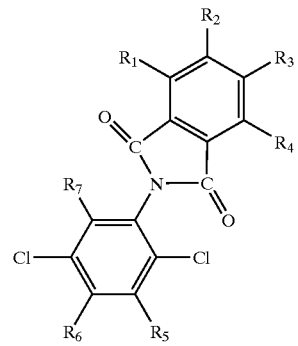
(4)

(wherein $R_1$–$R_7$ are as defined earlier) and 80–99.5% by weight of a dichlorobenzene represented by the following general formula (5) (wherein Ar2 is phenylene or alkyl-substituted phenylene radical) in the presence of an alkali metal sulfide.

$$Cl-Ar_2-Cl \qquad (5)$$

This invention will be described in detail below. The polyarylene sulfide resin of this invention comprises 0.5–10% by weight, preferably 1–8% by weight, of the constituent unit represented by the aforementioned general formula (1) and 80–99.5% by weight, preferably 92–99% by weight, of the constituent unit represented by the aforementioned general formula (2).

In the first place, a process and raw materials generally used for the preparation of the resin of this invention will be explained. Since the following account is an example, it is needless to say that any resin comprising the aforementioned constituent units at the specified ratio is satisfactory as the resin of this invention.

A compound which generates the radical represented by general formula (3) as the constituent unit of the resin of this invention is at least one of the compounds represented by the aforementioned general formula (4). A compound of this kind can be obtained from phthalic anhydride or its derivative and 2,5-dichloroaniline or its derivative. Here, the radicals $R_1$–$R_7$ are independently hydrogen atoms or lower alkyl groups containing 1–3 carbon atoms and preferably they are all hydrogen atoms.

A compound which generates the radical represented by the aforementioned general formula (2) is represented by the aforementioned general formula (5). Here, $Ar_2$ is phenylene or alkyl-substituted phenylene radical, preferably phenylene radical. Concretely, it is one kind or more of dichlorobenzenes selected from dichlorobenzene and alkyl-substituted dichlorobenzenes, and it is generally dichlorobenzene. There are ortho-, meta- and para-isomers for dichlorobenzenes and para-isomers are preferable. More preferable is p-dichlorobenzene. In the case of alkyl-substituted dichlorobenzenes, the alkyl radical preferably contains 3 or less carbon atoms.

To be precise, a compound represented by general formula (4) and a dichlorobenzene are so used that the proportions of the radical represented by general formula (1) and the radical represented by general formula (2) remain in the aforementioned range. However, since the proportions in the raw material roughly coincide with those in the resin, the raw materials are taken so that the compound represented by general formula (4) accounts for 0.5–10% by weight, preferably 1–8% by weight, and the dichlorobenzene accounts for 80–99.5% by weight, preferably 92–99% by weight. If the proportion of the compound represented by general formula (4) becomes less than 0.5% by weight, there would substantially be produced no effect for reducing generation of flash. On the other hand, if the proportion exceeds 10% by weight, the melt viscosity would become excessively high during molding thereby deteriorating moldability.

The polychloro aromatic compounds to be used as raw materials may be the compounds represented by the aforementioned general formulas (4) and (5) alone or may additionally contain a small amount of other polychloro aromatic compounds. In the latter case, the amount of other polychloro compounds is kept preferably at or below 10% by weight of the total polychloro aromatic compounds. The use of other polychloro aromatic compounds introduces constituent units other than those represented by general formulas (1) and (2) in proportion to the amounts of other polychloro aromatic compounds used.

The aforementioned other polychloro aromatic compounds include dichlorobiphenyl, dichlorodiphenyl ether, dichlorodiphenyl ketone and dichloronaphthalene. The compounds cited have isomers and preferable are those compounds which have chlorine atoms in a symmetrical position, for example, para isomers and 2,6- or 2,7-dichloronaphthalene. If necessary, trichlorobenzene and the like may be used.

The resin of this invention can be prepared according to a process publicly known for the preparation of PPS resins. For example, a process for preparing polymers of relatively low molecular weight disclosed in JP 70-3368 B and a process for preparing linear polymers of relatively high molecular weight disclosed in JP 1977-12240 B are available.

In addition, a process for polymerization in the presence of sulfur, a process for polymerization in the presence of an alkali metal sulfide and a process for self-polymerization of a raw material such as p-chlorothiophenol are available. A variety of additives, catalysts and solvents may be used in the aforementioned reactions.

A preferred process is the one which effects polymerization in the presence of sulfur or an alkali metal sulfide. The amount of sulfur source, that is, sulfur or an alkali metal sulfide is 0.9–1.1 mole per 1 mole of polychloro aromatic compound.

The process for polymerization in the presence of an alkali metal sulfide is based on the reaction to be effected in a polar solvent in the presence of an alkali metal sulfide. A typical alkali metal sulfide is sodium sulfide, but a combination of hydrated sodium sulfide, sodium sulfide or sodium hydrosulfide and sodium hydroxide or a combination of hydrogen sulfide and sodium hydroxide may be used. Polar solvents useful for the reaction include aprotic organic polar solvents such as amides, lactams and urea compounds, N-methylpyrrolidone (NMP) being preferable. The reaction temperature is normally in the range of 220–370° C. and the reaction time is in the range of 1–20 hours.

The polyarylene sulfide resin of this invention must have a weight average molecular weight of 10,000 or more, preferably 20,000–200,000. The resin of this invention can be used singly as molding resin and can be molded by injection and the like with reduced generation of flash compared with the conventional PPS resins or those PPS resins which do not contain the constituent unit represented by general formula (1). Reduced generation of flash here means that the length of flash is less than that of the standard PPS resin (unmodified), preferably ½ or less, when the standard and test resins are molded under the same conditions (a dumbbell-shaped test specimen is injection-molded in accordance with ASTM D638 and a reference should be made to the method described in the examples for the detailed conditions).

The polyarylene sulfide resin of this invention may be used together with other resins or with additives such as inorganic fillers to form a resin composition. Such other resins include other ordinary polyarylene sulfide resins and resins other than polyarylene sulfide resins such as polyphenylene oxide resins (PPO), polyamides, polysulfones and polybutylene terephthalate (PBT). The proportion of the polyarylene sulfide resin of this invention is preferably 10–90% by weight of the total resins in a given resin composition.

The polyarylene sulfide resin of this invention may be incorporated in an ordinary PPS resin to yield polyarylene sulfide resin composition A moldable with reduced generation of flash. In this case, the content of the polyarylene sulfide resin of this invention is preferably 10–90% by weight. From the viewpoint of reduced generation of flash, the resin composition is formulated so that the constituent unit represented by formula (1) in the total polyarylene sulfide resins containing PPS resin becomes 0.1–10% by weight, preferably 0.5–10% by weight. That is, in the case of the aforementioned formulation, supposing the proportion of the resin of this invention to be incorporated in PPS resin is A % by weight and the proportion of the constituent unit represented by formula (1) in the resin of this invention is B % by weight, the value of A or B may be varied so that $A \times B = 10$–1,000, preferably 50–1,000, and the value of B may exceed the aforementioned range of 0.5–10.

Furthermore, in blending of ordinary PPS resin with one of those resins which are amenable to blending with ordinary PPS resin, it is possible to substitute the polyarylene sulfide resin of this invention or the aforementioned polyarylene sulfide resin composition A for a whole or part of ordinary PPS resin to yield a polyarylene sulfide resin composition B moldable with reduced generation of flash. The resins amenable to blending with ordinary PPS resin include publicly known resins such as polycarbonates, PPO, polyamides, polysulfones, PBT, PET and polystyrene. In this case, the content of the polyarylene sulfide resin of this invention is preferably 10–90% by weight of the total resins. From the viewpoint of reduced generation of flash, the amount of the polyarylene sulfide resin of this invention or the aforementioned polyarylene sulfide resin composition A to be incorporated is preferably so chosen that the proportion of the constituent unit represented by formula (1) in the total polyarylene sulfide resins is in the range of 0.1–10% by weight, preferably 0.5–10% by weight.

Further, it is allowable to incorporate inorganic fillers in the polyarylene sulfide resin of this invention or in the aforementioned polyarylene sulfide resin composition A or polyarylene sulfide resin composition B to yield polyarylene sulfide resin composition C. Inorganic fillers are not restricted and those which are fibrous, powdery, granular or scaly may be used. The fibrous fillers include glass fibers, asbestos fibers, carbon fibers, silica fibers and aramid fibers. The powdery, granular or scaly fillers include silica, alumina, talc, mica, kaolin, clay, silica-alumina, calcium carbonate, glass, glass beads and carbon black.

Further, in addition to the aforementioned ingredients, it is allowable as needed to incorporate in the polyarylene sulfide resin of this invention, polyarylene sulfide resin composition A, polyarylene sulfide resin composition B or polyarylene sulfide resin composition C other publicly known additives such as antioxidants, UV absorbers, parting agents, heat stabilizers, lubricants and colorants.

Preferred Embodiments of the Invention

This invention will be described further below with reference to the accompanying examples, but will not be limited to these examples.

Determination of the Molecular Weight of Resin

The molecular weight of resin was determined by the use of a gel permeation chromatograph equipped with a multi-angle light scattering detector and a UV/VIS detector available from Senshu Scientific Co., Ltd.

Determination of Glass Transition Temperature (Tg)

The glass transition temperature was determined by the use of DSC 7 available from Perkin-Elmer Corporation.

Measurement of Flashing Characteristics

A dumbbell-shaped test specimen was injection-molded in accordance with ASTM D638 and the length of flash was measured. The injection pressure which greatly influences the generation of flash was controlled at a level which does not cause short shots.

EXAMPLE 1

Comparative

In an autoclave were placed 1.0 mole of sodium sulfide (purity, 61.5%) and 280 g of N-methyl-2-pyrrolidone (NMP) and the mixture was heated to 202° C. over a period of approximately 2 hours to distill 22.7 g of water while blowing nitrogen gas into the autoclave. The reaction mixture was cooled to 175° C., 0.10 mole of sodium acetate trihydrate, 50 g of NMP and 1.02 mole 1,4-dichlorobenzene (DCB) were added and the resultant mixture was allowed to react at 245° C. for 3 hours in an atmosphere of pressurized nitrogen gas (0.14 MPa). The reactor was cooled and the product was taken out and washed with hot water. A PPS resin with a Tg of 84° C. and a Tm of 285° C. was obtained in 94% yield.

EXAMPLES 2–4

Polyarylene sulfide resins (modified PPS resins) were prepared as in Example 1 while substituting N-(2,5-dichlorophenyl)phthalimide (DCPPI) for a portion of the DCB. The weight ratio of DCB to DCPPI was 99:1 in Example 2, 95:5 in Example 3 and 90:10 in Example 4.

EXAMPLE 5

Comparative

A modified PPS resin was prepared as in Example 1 except using a mixture of DCB and DCPPI at a weight ratio of 80:20.

The molecular weight, Tg, and flashing characteristics were determined for the product in each example and the results are shown in Table 1.

TABLE 1

|  | Molecular weight (Mw) | Length of flash (μm) | Tg (° C.) |
| --- | --- | --- | --- |
| Example 1 | 3.7 × 10⁴ | 520 | 85 |
| Example 2 | 3.5 × 10⁴ | 80 | 93 |
| Example 3 | 3.7 × 10⁴ | 30 | 112 |
| Example 4 | 3.2 × 10⁴ | 10 | 138 |
| Example 5 | 3.4 × 10⁴ | Unmoldable | 168 |

EXAMPLE 6

A polymer blend of the polyarylene sulfide resin prepared in Example 3 and commercial PBT resin (Toraycon 1401 X06 available from Toray Industries, Inc.) at a weight ratio of 70:30 was pelletized and injection-molded as in the aforementioned examples and the flashing characteristics were evaluated. The length of flash was 20 μm.

EXAMPLE 7

A polymer blend of the polyarylene sulfide resin prepared in Example 3 and commercial PPO resin (Xyron 220 V/Z available from Asahi Kasei Corporation) at a weight ratio of 70:30 was pelletized and injection-molded as in the aforementioned examples and the flashing characteristics were evaluated. The length of flash was 40 μm.

INDUSTRIAL APPLICABILITY

The novel polyarylene sulfide resin of this invention and a resin composition comprising said polyarylene sulfide resin can be molded with markedly reduced generation of flash and are useful for molding a variety of articles, particularly connectors of electronic parts.

What is claimed is:

1. A polyarylene sulfide resin comprising 0.5–10% by weight of the constituent unit represented by the following general formula (1) and 80–99.5% by weight of the constituent unit represented by the following general formula (2):

(1)

(2)

wherein $Ar_1$ is the radical represented by general formula (3),

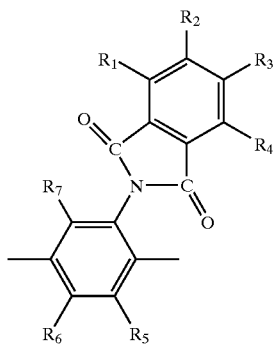 (3)

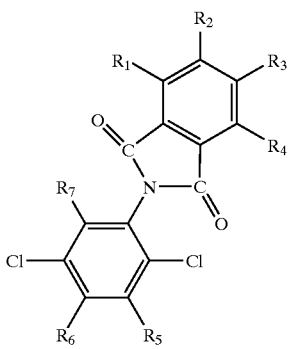 (4)

$Ar_2$ is phenylene or alkyl-substituted phenylene radical, $R_1$–$R_7$ are independently hydrogen atoms or lower alkyl radicals containing 1–3 carbon atoms and n and m are integers of 1 or more.

2. A polyarylene sulfide resin as described in claim 1 wherein $R_1$–$R_7$ are all hydrogen.

3. A process for preparing a polyarylene sulfide resin which comprises polymerizing polychloro aromatic compounds comprising 0.5–10% by weight of a arylenedichloride represented by the following general formula (4) and 80–99.5% by weight of a dichlorobenzene represented by the following general formula (5) in the presence of, an alkali metal sulfide,

 (5)

wherein $R_1$–$R_7$ are independently hydrogen atoms or lower alkyl radicals containing 1–3 carbon atoms and $Ar_2$ is phenylene or alkyl-substituted phenylene radical.

4. A polyarylene sulfide resin composition which comprises the polyarylene sulfide resin described in claim 1 in an amount corresponding to 10–90% by weight of the total resins.

* * * * *

UNITED STATES PATENT AND TRADEMARK OFFICE
CERTIFICATE OF CORRECTION

PATENT NO. : 6,787,631 B2
DATED : September 7, 2004
INVENTOR(S) : Shiraishi et al.

It is certified that error appears in the above-identified patent and that said Letters Patent is hereby corrected as shown below:

<u>Title page,</u>
Item [22], PCT Filed, replace "Dec. 11, 2001" with -- Nov. 12, 2001 --.

Signed and Sealed this

Seventeenth Day of May, 2005

JON W. DUDAS
*Director of the United States Patent and Trademark Office*